US008559074B2

(12) United States Patent
Keniston et al.

(10) Patent No.: US 8,559,074 B2
(45) Date of Patent: Oct. 15, 2013

(54) ILLUMINATION DEVICE FOR AN IMAGE CAPTURE SYSTEM

(75) Inventors: Matthew Ryan Keniston, Lexington, KY (US); Paul Scott Nicholas Sherrill, Lexington, KY (US); Mark Eric Miller, Versailles, KY (US); William Michael Connors, Lexington, KY (US); Kevin Garcia, Tucson, AZ (US)

(73) Assignee: Lexmark International, Inc., Lexington, KY (US)

( * ) Notice: Subject to any disclaimer, the term of this patent is extended or adjusted under 35 U.S.C. 154(b) by 168 days.

(21) Appl. No.: 13/080,838

(22) Filed: Apr. 6, 2011

(65) Prior Publication Data

US 2012/0257371 A1    Oct. 11, 2012

(51) Int. Cl.
*H04N 1/04*    (2006.01)

(52) U.S. Cl.
USPC ............................ 358/475; 358/509; 358/474

(58) Field of Classification Search
USPC ................ 358/474, 501, 475, 509, 483, 482; 359/618, 716, 626
See application file for complete search history.

(56) References Cited

U.S. PATENT DOCUMENTS

| | | | | |
|---|---|---|---|---|
| 4,905,243 | A | * | 2/1990 | Lokai et al. ..................... 372/32 |
| 5,014,332 | A | * | 5/1991 | Nakajima et al. ............. 382/274 |
| 5,773,810 | A | * | 6/1998 | Hussey et al. ............ 235/462.25 |
| 6,633,418 | B1 | * | 10/2003 | Yamazaki ..................... 358/506 |
| 6,687,028 | B1 | * | 2/2004 | Kasahara et al. ............. 358/509 |
| 6,690,469 | B1 | * | 2/2004 | Shibata et al. ................ 356/369 |
| 6,864,916 | B1 | * | 3/2005 | Nayar et al. ................ 348/224.1 |
| 7,196,849 | B2 | * | 3/2007 | McGuire et al. .............. 359/630 |
| 7,352,510 | B2 | | 4/2008 | Cummings et al. |
| 7,360,899 | B2 | * | 4/2008 | McGuire et al. ................ 353/20 |
| 7,450,310 | B2 | * | 11/2008 | McGuire ...................... 359/630 |
| 7,540,616 | B2 | * | 6/2009 | Conner ........................... 353/20 |
| 8,267,528 | B2 | * | 9/2012 | Conner et al. .................. 353/94 |
| 2006/0262514 | A1 | * | 11/2006 | Conner et al. .................. 362/19 |
| 2007/0146639 | A1 | * | 6/2007 | Conner ........................... 353/20 |
| 2008/0259460 | A1 | | 10/2008 | Cummings et al. |

* cited by examiner

*Primary Examiner* — Negussie Worku
(74) *Attorney, Agent, or Firm* — Justin M Tromp (57) ABSTRACT

An illumination device for an image capture system according to one example embodiment includes an integrating light pipe having an input face and an output face. The integrating light pipe is positioned to receive light from a light source at the input face and transmit the light at the output face. A projection element is positioned to focus the light from the output face to a document plane to be imaged by an image sensor. A uniformity correction device is positioned to attenuate the light from the output face so that the light has a substantially uniform intensity at the image sensor and a less uniform intensity at the document plane than at the image sensor.

22 Claims, 7 Drawing Sheets

ILLUMINATION DEVICE FOR AN IMAGE CAPTURE SYSTEM

CROSS REFERENCES TO RELATED APPLICATIONS

None

STATEMENT REGARDING FEDERALLY SPONSORED RESEARCH OR DEVELOPMENT

None.

REFERENCE TO SEQUENTIAL LISTING, ETC.

None.

BACKGROUND

1. Field of the Disclosure

The present invention relates generally to an optical image capture system, and more particularly to an illumination assembly for producing a substantially uniform intensity at an image sensor of the image capture system.

2. Description of the Related Art

Image capture systems are used in a variety of applications. Such systems may be combined in an all-in-one unit that includes image capture, image formation, and facsimile functions. Image capture systems may also be independent and only capable of performing an image capture function. Digital photograph technology has progressed with imaging units now able to produce high quality two dimensional images in a single step process. The imaging units are also economical allowing them to be utilized in new applications, such as document scanning technology.

Conventional image capture systems utilizing digital photograph technology include a light source that illuminates a document plane and an image sensor that captures an image of the document plane. In order to obtain a high quality scan, substantially uniform illumination is desired. One existing approach has been to include one or more correction devices that correct any non-uniformity effects that occur between the light source and the document plane to provide substantially uniform illumination at the document plane. However, it has been observed that additional non-uniformity effects may occur between the document plane and the image sensor. These additional non-uniformities can cause degradation of the image captured by the image sensor even where uniform illumination of the document plane is achieved.

Specifically, some image sensors used with digital photograph technology possess an inherent intensity roll-off from the center of the document outward thereby causing a lower perceived intensity at the edges of the document. Some lens configurations can add to this roll-off. As a result, a uniformly illuminated document plane appears slightly to non-uniform in the resulting image capture. Further, in some image capture systems, one or more mirrors may be desired between the document plane and the image sensor in order to reduce the overall footprint of the system. However, variation between the reflectance of the mirror and the incident angle of the light over the surface of the mirror can create additional non-uniformities. Specifically, areas of the document plane having a larger incident light angle in relation to the mirror normal experience a significantly different illumination intensity in comparison with areas having a smaller incident light angle.

Accordingly, it will be appreciated that an image capture system that corrects the non-uniformity effects that occur between the document plane and the image sensor to achieve substantially uniform illumination at the image sensor is desired.

SUMMARY

An illumination device for an image capture system according to one example embodiment includes an integrating light pipe having an input face and an output face. The integrating light pipe is positioned to receive light from a light source at the input face and transmit the light at the output face. A projection element is positioned to focus the light from the output face to a document plane to be imaged by an image sensor. A uniformity correction device is positioned to attenuate the light from the output face so that the light has a substantially uniform intensity at the image sensor and a less uniform intensity at the document plane than at the image sensor.

BRIEF DESCRIPTION OF THE DRAWINGS

The above-mentioned and other features and advantages of the various embodiments, and the manner of attaining them, will become more apparent and will be better understood by reference to the accompanying drawings.

DETAILED DESCRIPTION

The following description and drawings illustrate embodiments sufficiently to enable those skilled in the art to practice the present invention. It is to be understood that the disclosure is not limited to the details of construction and the arrangement of components set forth in the following description or illustrated in the drawings. The invention is capable of other embodiments and of being practiced or of being carried out in various ways. For example, other embodiments may incorporate structural, chronological, electrical, process, and other changes. Examples merely typify possible variations. Individual components and functions are optional unless explicitly required, and the sequence of operations may vary. Portions and features of some embodiments may be included in or substituted for those of others. The scope of the application encompasses the appended claims and all available equivalents. The following description is, therefore, not to be taken in a limited sense, and the scope of the present invention is defined by the appended claims.

Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

Figure 1:
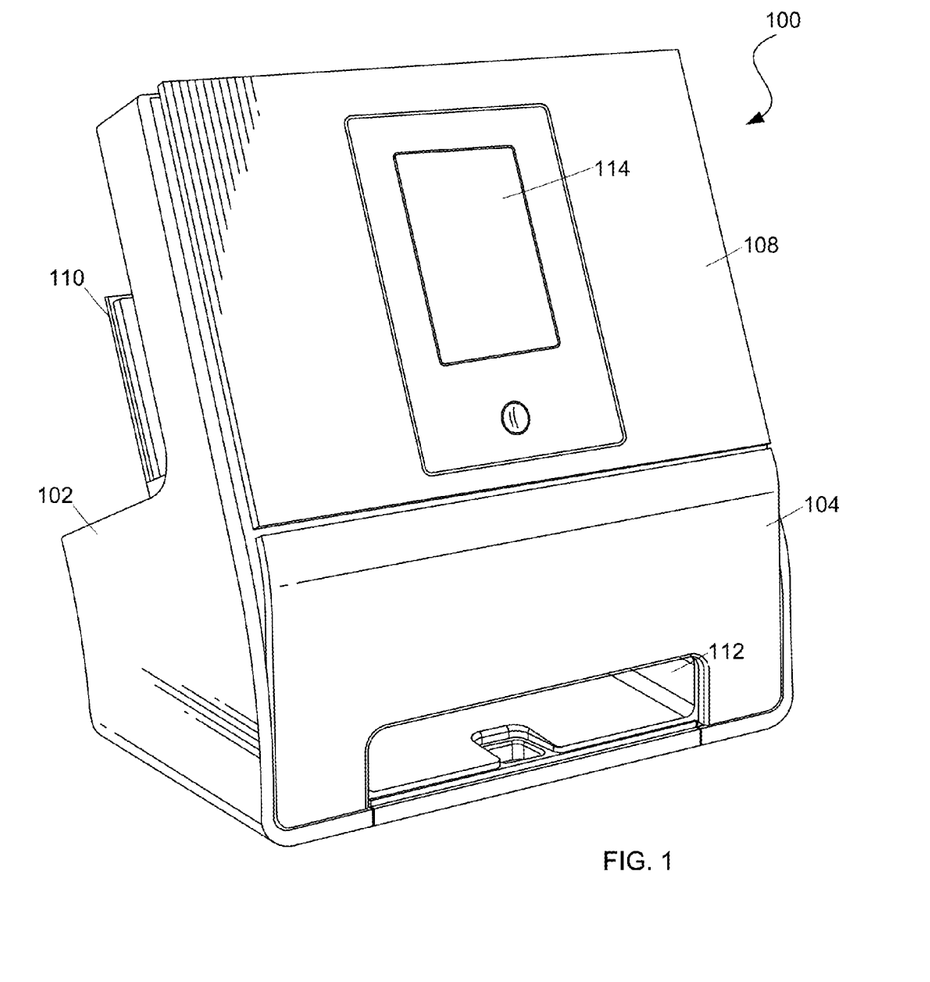
FIGS. 1 and 2 are perspective views of an imaging device according to one example embodiment.
Figure 2:
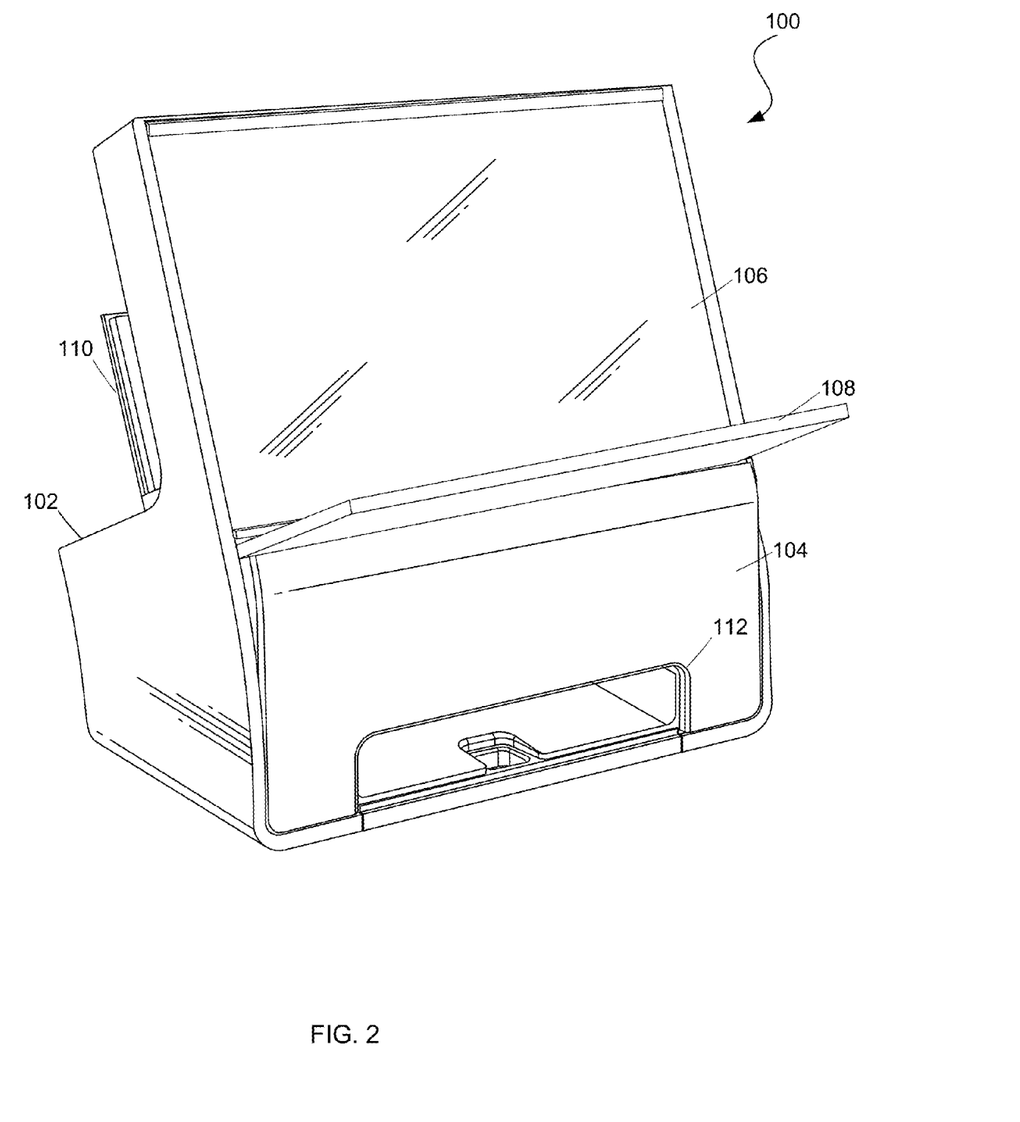

FIGS. 1 and 2 illustrate perspective views of an imaging device 100 according to one example embodiment. Imaging device 100, which may be a standalone imaging device, includes a housing 102 having a front portion 104 including an imaging window 106 (FIG. 2). Imaging window 106 may be constructed from a rigid, transparent and/or translucent material, such as glass.

Imaging device 100 also includes a lid 108 pivotally connected to the front portion 104 of housing 102. Lid 108 may be pivotally connected along a bottom edge thereof to housing 102 via hinges or the like (not shown) to allow lid 108 to move between a closed position as shown in FIG. 1 and an open position as shown in FIG. 2. The back portion of imaging device 100 may have an input media tray 110 that retains one or more print media sheets therein. A media output area 112 may be positioned along a lower part of front portion 104.

Figure 3:
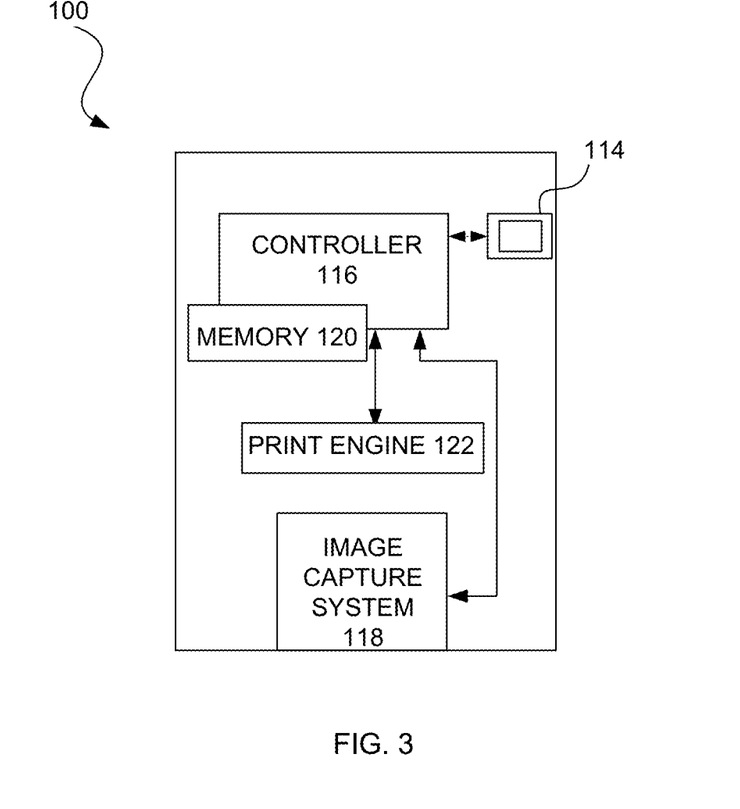
FIG. 3 is a block diagram of at least some of the components of the imaging device illustrated in FIGS. 1 and 2.

FIG. 3 is a block diagram depicting at least some of the main components of imaging device 100. Imaging device 100 includes an image capture system 118 disposed within housing 102 which captures an image from one or more documents disposed against imaging window 106. Image capture system 118 may be coupled to and controlled by a controller 116 of imaging device 100. Imaging device 100 may also optionally include a print engine 122, controlled by controller 116, for forming an image onto a sheet of media. Print engine 122 may include any of a variety of different types of printing mechanisms including dye-sublimation, dot-matrix, ink-jet or laser printing. Imaging device 100 may include one or more mechanisms (not shown) for picking a sheet of media from input media tray 110, moving the picked sheet to be adjacent to print engine 122 for printing an image thereon, and moving the picked sheet having the printed image to output area 112.

Imaging device 100 may include a user interface, such as a graphical user interface, for receiving user input concerning image formation or image capture operations performed or to be performed by imaging device 100, and for providing to the user information concerning same. The user interface may include firmware maintained in memory 120 within housing 102 which is performed by controller 116 or other processing element. In the example embodiment illustrated, the graphical user interface includes a display panel 114, which may be a touch screen display in which user input is provided by the user touching or otherwise making contact with panel 114. As shown in FIG. 1, display panel 114 may be disposed along the outer surface of lid 108 and sized for providing graphic images that allow for convenient communication of information between imaging device 100 and the user. Display panel 114 may include a liquid crystal display, a light emitting diode display or the like.

Figure 4:
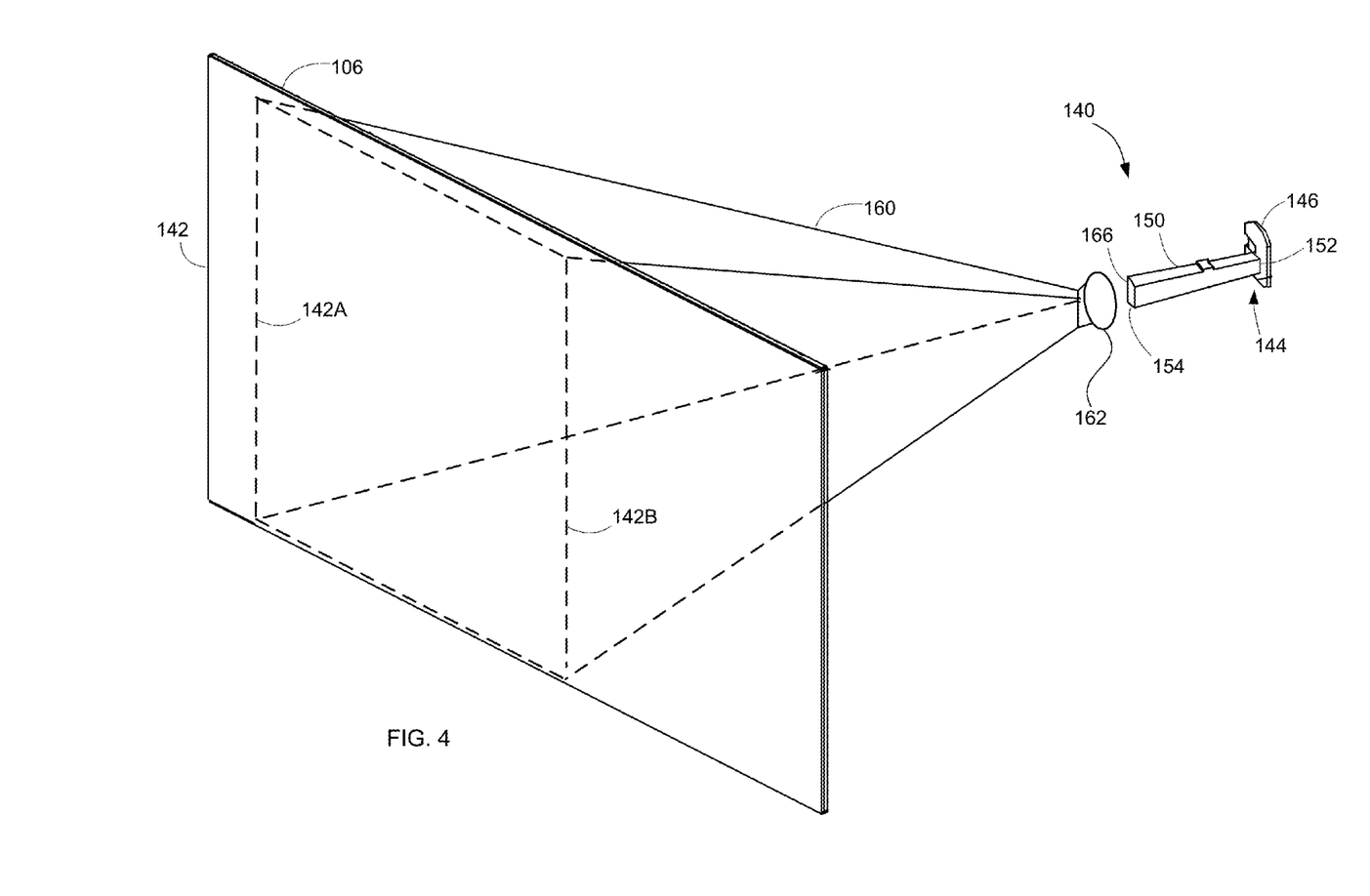
FIG. 4 is a perspective view of an illumination device for an image capture to system according to a first example embodiment.

FIG. 4 is a perspective view of an illumination device 140 for image capture system 118 according to one example embodiment. Illumination device 140 is positioned within housing 102 behind imaging window 106, which defines a document plane 142. Illumination device 140 includes a light source 144. Light source 144 may include a single light emitting diode or an array of light emitting diodes (LEDs), such as a three channel array of red, green and blue LEDs, operatively mounted on a printed circuit board assembly 146. Controller 116 of imaging device 100 is coupled to and controls the operation of light source 144 through printed circuit board assembly 146. Alternatives include those wherein a conventional light source, such as various light bulbs, is used.

Illumination device 140 also includes an integrating light pipe 150. Light pipe 150 includes an input face 152 that is positioned to receive light from light source 144 and an output face 154 that transmits light from light source 144 along an optical path 160 to document plane 142. As is known in the art, a light pipe is a tapered optic design that is used to convert a point light source, such as an LED, to a larger uniformly illuminated two dimensional surface. Light pipe 150 corrects illumination non-uniformities caused by the differences in the relative positions of the light sources, which in the example embodiment shown are multiple LED die, by way of total internal reflection. Each die is referred to as an individual channel of the multi-channel light source 144 and may vary in position with respect to input face 152. As desired, output face 154 of light pipe 150 may also provide collimation of the light rays from light source 144.

Figure 5A:
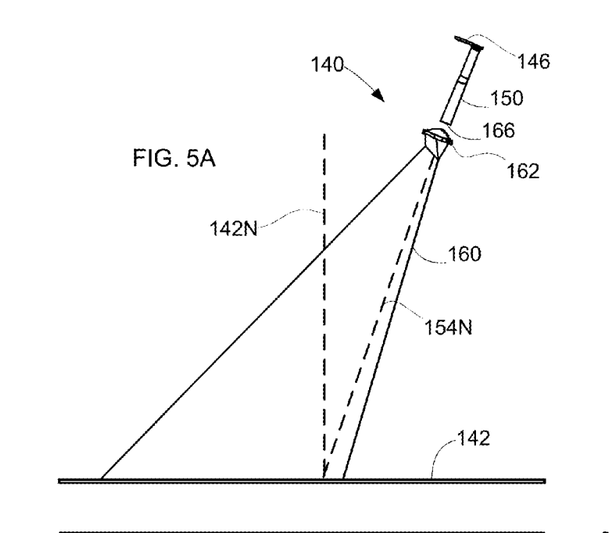
FIG. 5A is a top plan view of the illumination device illustrated in FIG. 4.
Figure 5B:
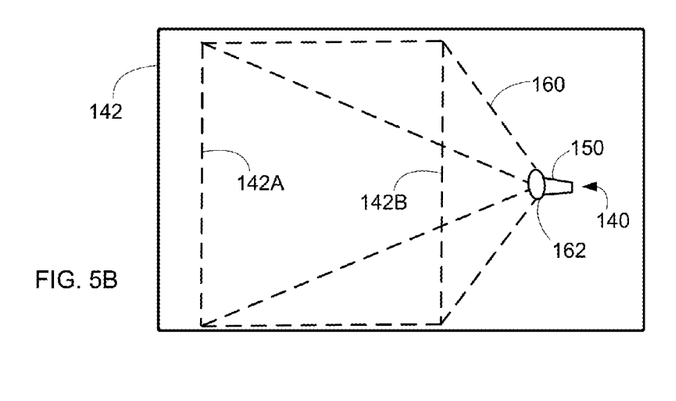
FIG. 5B is a rear elevation view of the illumination device illustrated in FIG. 4.
Figure 5C:
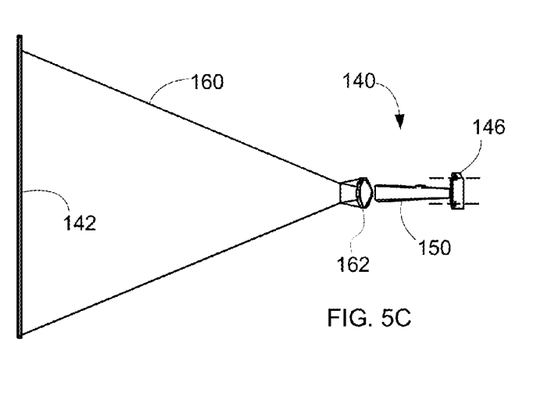
FIG. 5C is a side elevation view of the illumination device illustrated in FIG. 4.
Figure 7:
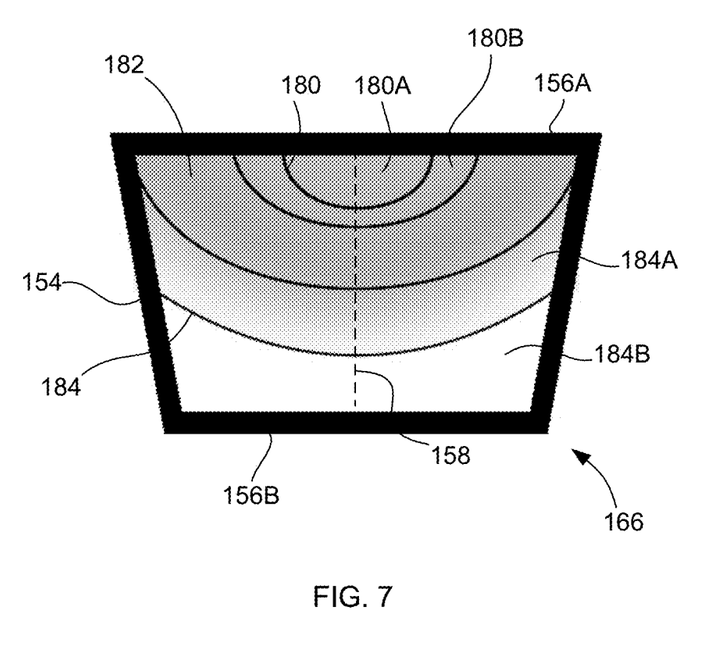
FIG. 7 is a schematic view of a uniformity correction device in the form of a gradient filter according to one example embodiment.

FIG. 5A is a top plan view of illumination device 140 and FIGS. 5B and 5C are rear and side elevation views, respectively, of illumination device 140. In the example embodiment illustrated, the exit normal 154N of output face 154 is offset from the normal 142N of document plane 142. In this embodiment, input face 152 of light pipe 150 has a rectangular cross section and output face 154 has an isosceles trapezoidal cross section in order to correct for the keystone effect that results from this offset. The Scheimpflug condition is used to create a rectangular image from the trapezoidal surface of the integrator light pipe. As shown in FIG. 7, the trapezoidal output face 154 includes a pair of substantially parallel edges 156A, 156B. First edge 156A is longer than second edge 156B. Light from first edge 156A illuminates a first portion 142A of document plane 142 optically nearest to output face 154 while light from second edge 156B expands to illuminate a second portion 142B of document plane 142 optically farthest from output face 154 (FIG. 4).

Figure 6:
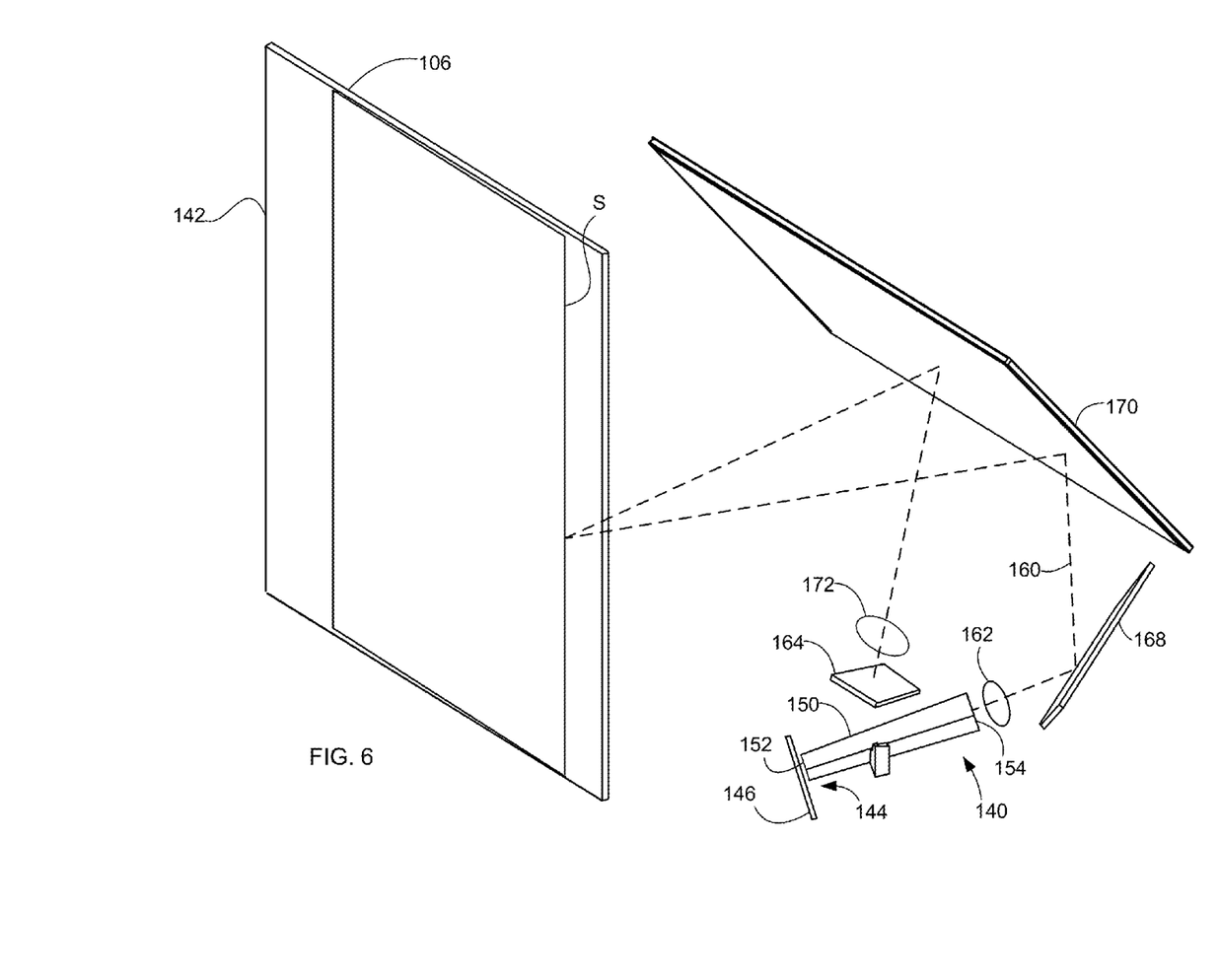
FIG. 6 is a perspective view of an illumination device for an image capture system according to a second example embodiment.

With reference back to FIG. 4, illumination device 140 further includes a projection element 162 that is positioned to focus the light from output face 154 of light pipe 150 onto document plane 142 so that document plane can be imaged by an image sensor 164 (FIG. 6). In the example embodiment illustrated, projection element 162 is a combination of a condenser and objective lens. In one embodiment, the condenser is a biconvex aspherical lens. However, projection element 162 may be any suitable device, or combination of devices, for focusing light from output face 154 of light pipe 150 to document plane 142 such as a curved mirror or a multi-element system.

In one embodiment, projection element 162 is positioned relative to light pipe 150 so that a focal point of projection element 162 is offset from output face 154 (the image plane) as well as document plane 142 (the object plane). This offset is achieved by placing projection element 162 slightly closer or slightly farther than one focal length from output face 154 to project output face 154 slightly out of focus at document plane 142. This desensitizes image capture system 118 to any defects on output face 154 that appear on document plane 142 in order to reduce or eliminate the signal noise associated with these defects.

Illumination device 140 also includes a uniformity correction device 166 that is positioned to attenuate and transmit light received from output face 154 of light pipe 150. In the example embodiment illustrated, uniformity correction device 166 is positioned at output face 154 of light pipe 150. However, uniformity correction device 166 may be positioned at any suitable point along optical path 160 as desired as long as it does not interfere with or block image sensor 164 from capturing an image of document plane 142.

Uniformity correction device 166 attenuates the light travelling along optical path 160 to achieve a substantially uniform intensity distribution at image sensor 164. To do this, uniformity correction device 166 must account for the non-uniformities that occur between light source 144 and document plane 142 as well as the non-uniformities that occur between document plane 142 and image sensor 164 as will be explained in greater detail below. As a result, the intensity (or irradiance) distribution is intentionally less uniform at document plane 142 than at image sensor 164 in order to maximize the uniformity at image sensor 164. For example, in one embodiment, laboratory testing demonstrated that the photo response non-uniformity at document plane 142 is about 15% higher than at image sensor 164. In some embodiments, the light at document plane 142 has a substantially non-uniform intensity distribution.

As illustrated in FIGS. 4, 5A, 5B and 5C, a direct optical path 160 may be provided from projection element 162 to document plane 142 such that the light from projection element 162 is not diverted or folded by mirrors or the like. FIG. 6 illustrates another example embodiment that includes a pair of mirrors 168, 170 in optical path 160. Mirrors 168, 170 are used to reduce the footprint of image capture system 118 to permit a reduction in the size of the portion of body 102 used to contain image capture system 118. Although two mirrors are illustrated, any number of mirrors may be employed as desired. In the example embodiment illustrated, light first passes from light source 144 through light pipe 150 and uniform correction device 166. The light is then projected along optical path 160 by projection element 162 to first mirror 168 which directs the light to second mirror 170. Second mirror 170 then directs the light to document plane 142 defined by imaging window 106. Imaging window 106 is illustrated with a media sheet S positioned on an outer surface thereof for image capture. The light beam is reflected from document plane 142 back to second mirror 170 which reflects the light beam through a lens assembly 172 to image sensor 164 which captures an image of sheet S. Suitable image sensors 164 include CCD and CMOS type sensors.

It has been observed that optimum image capture is achieved where the normal of image sensor 164 is substantially perpendicular to document plane 142 as shown in FIG. 6. As a result, in this embodiment, the light received by document plane 142 from light source 144 must have a primary optical axis that is at an oblique angle of incidence relative to document plane 142. In this configuration, as discussed above, output face 154 of light pipe 150 has an isosceles trapezoidal cross section to correct for the keystone effect that occurs as a result of the oblique approach.

Each illumination device 140 may be used to illuminate the entirety of document plane 142. Alternatively, multiple illumination devices 140 may be used in combination to illuminate document plane 142 by positioning each illumination device 140 to illuminate a portion of document plane 142. Each illumination device 140 may illuminate a discrete section of document plane 142 or the various illuminated portions may overlap. Controller 116 or another processing element may then be used to piece together the individual portions and discard any overlapping areas to form the completed image.

FIG. 7 shows one example embodiment of uniformity correction device 166 in the form of a gradient filter. In this embodiment, the gradient filter is an absorption filter that absorbs the suppressed light. Alternatives include those wherein the gradient filter is designed from a reflective material to recycle/reuse the suppressed light. The gradient filter is chosen to attenuate areas in the illumination field from output face 154 that have higher perceived intensity by image sensor 164. As illustrated, a complex gradient pattern is required to address the various different sources of non-uniformity. For example, CMOS image sensor roll-off results in radial intensity non-uniformity. The projection of the trapezoidal output face 154 causes a bi-directional intensity non-uniformity effect. Differences in the incident angles of the light over the surface(s) of the mirror(s) create additional non-uniformities. Further, in those embodiments where the focal point of projection element 162 is offset from output face 154, the relationship between the illumination regions of output face 154 and the corresponding regions at document plane 142 to which they are projected is altered. The gradient filter illustrated takes into account and corrects each of these non-uniformities.

In the example embodiment illustrated, the gradient filter includes a partially elliptical region 180 abutting first edge 156A of output face 154. As used herein, the term "partially elliptical region" also encompasses a region that is partially circular. A first partially toroidal region 182 is positioned next to partially elliptical region 180. A second partially toroidal region 184 is positioned next to first partially toroidal region 182 and abuts second edge 156B. Each region 180, 182, 184 is centered about a centerline 158 between edges 156A, 156B. As depicted by the grayscale in FIG. 7, first partially toroidal region 182 attenuates more light than partially elliptical region 180 while partially elliptical region 180 attenuates more light than second partially toroidal region 184. Second partially toroidal region 184 attenuates the least light of these regions because it has been observed that second portion 142B of document plane 142, which is optically farthest from output face 154, receives the least intense light. Conversely, first partially toroidal region 182 attenuates the most light of these regions because it has been observed that a portion of document plane 142 between first edge 142A and second edge 142B receives the most intense light.

As illustrated in FIG. 7, partially elliptical region 180 may be further divided into an inner portion 180A and an outer portion 180B having a larger radius than inner portion 180A. Inner portion 180A attenuates less light than outer portion 180B. Further, second partially toroidal region 184 may be divided into an inner portion 184A and an outer portion 184B having a larger radius than inner portion 184A. Inner portion 184A attenuates more light than outer portion 184B.

The gradient pattern illustrated was determined empirically using image sensor 164. The process involved first capturing an image with image sensor 164 and lens assembly 172 without applying any illumination correction. The uncorrected illumination field included all of the non-uniformity effects present in the system. The image was then digitally inverted and normalized to map the brightest regions needing the most attenuation and the darkest regions needing the least attenuation. Without illumination correction, photo response non-uniformity on the order of about 60% to about 65% was experienced at image sensor 164.

The first gradient tested was a linear gradient. The linear gradient filter attenuated light in a linearly decreasing proportion from first edge 156A to second edge 156B. It was observed that this filter did not correct the areas of highest intensity or the radial roll-off induced by image sensor 164 and lens assembly 172. A radial gradient was then constructed by performing a ray trace from output face 154 of light pipe 150 to document plane 142. The results of the ray trace were compared to the locations of highest intensity previously located to determine the point of highest required attenuation at output face 154. Once the points of highest required attenuation were determined, several opacity levels for the filter were tested using image sensor 164 and lens assembly 172. The level of opacity required to maximize the average intensity perceived by image sensor 164 was then determined thereby resulting in a gradient filter that takes into consideration the various causes of non-uniformity that occur between light source 144 and document plane 142 and between document plane 142 and image sensor 164. Laboratory testing demonstrated that this gradient filter produced photo response non-uniformity of less than about 40%, and in some cases less than about 25%, at image sensor 164.

One alternative method for deriving a suitable gradient filter is to perform mathematical or computer modeling to determine a predictive model of image capture system 118. One advantage of the predictive model approach is that it allows for mapping of a gradient filter at any point along the optical path.

The foregoing description of an embodiment has been presented for purposes of illustration. It is not intended to be exhaustive or to limit the application to the precise forms disclosed, and obviously many modifications and variations are possible in light of the above teaching. It is understood that the invention may be practiced in ways other than as specifically set forth herein without departing from the scope of the invention. It is intended that the scope of the application be defined by the claims appended hereto.

What is claimed is:

1. An illumination device for an image capture system, comprising:
   an integrating light pipe having an input face and an output face and being positioned to receive light from a light source at said input face and transmit the light at said output face;
   a projection element positioned to focus the light from said output face to a document plane to be imaged by an image sensor; and
   a uniformity correction device positioned to attenuate the light from said output face so that the light has a substantially uniform intensity at said image sensor and a less uniform intensity at said document plane than at said image sensor.

2. The illumination device of claim 1, wherein said uniformity correction device is a gradient filter positioned at said output face of said integrating light pipe.

3. The illumination device of claim 2, wherein said output face of said integrating light pipe has an isosceles trapezoidal cross section that includes a pair of substantially parallel edges; a first of said edges being longer than a second of said edges; said gradient filter having a partially elliptical region abutting said first edge, a first partially toroidal region positioned next to said partially elliptical region, and a second partially toroidal region positioned next to said first partially toroidal region and abutting said second edge; said partially elliptical region and said first and second partially toroidal regions being centered about a centerline between said edges; said first partially toroidal region attenuating more light than said partially elliptical region; and said partially elliptical region attenuating more light than said second partially toroidal region.

4. The illumination device of claim 1, wherein said uniformity correction device is a gradient filter that attenuates areas in an illumination field of the light from said output face with higher perceived intensity by said image sensor.

5. The illumination device of claim 1, wherein said input face of said integrating light pipe has a rectangular cross section and said output face of said integrating light pipe has an isosceles trapezoidal cross section.

6. The illumination device of claim 1, wherein said projection element is a combination of a condenser and objective lens.

7. The illumination device of claim 6, wherein said lens has a focal point that is offset from said output face of said integrating light pipe and said document plane in order to desensitize the image capture system to defects on said output face appearing on said document plane.

8. The illumination device of claim 1, wherein said projection element is a curved mirror.

9. The illumination device of claim 1, wherein said image sensor is a CMOS sensor.

10. The illumination device of claim 1, wherein the light has non-uniform intensity at said document plane.

11. The illumination device of claim 1, wherein a normal of said image sensor is substantially perpendicular to said document plane and a primary optical axis of the light received by said document plane is at an oblique angle relative to said document plane.

12. An illumination device for an image capture system, comprising:
    a document plane for positioning a document to be imaged;
    an image sensor positioned to capture an image of said document plane;
    a light source for illuminating said document plane that includes an array of red, blue and green light emitting diodes;
    an integrating light pipe having an input face and an output face and being positioned to receive light from said light source at said input face and transmit the light at said output face;
    a projection element positioned to focus the light from said output face to said document plane; and
    a uniformity correction device positioned to attenuate the light from said output face so that the light has a substantially uniform intensity at said image sensor and a less uniform intensity at said document plane than at said image sensor.

13. The illumination device of claim 12, wherein said uniformity correction device is a gradient filter positioned at said output face of said integrating light pipe.

14. The illumination device of claim 13, wherein said output face of said integrating light pipe has an isosceles trapezoidal cross section that includes a pair of substantially parallel edges; a first of said edges being longer than a second of said edges; said gradient filter having a partially elliptical region abutting said first edge, a first partially toroidal region positioned next to said partially elliptical region, and a second partially toroidal region positioned next to said first partially toroidal region and abutting said second edge; said partially elliptical region and said first and second partially toroidal regions being centered about a centerline between said edges; said first partially toroidal region attenuating more light than said partially elliptical region; and said partially elliptical region attenuating more light than said second partially toroidal region.

15. The illumination device of claim 12, wherein said uniformity correction device is a gradient filter that attenuates areas in an illumination field of the light from said output face with higher perceived intensity by said image sensor.

16. The illumination device of claim 12, wherein said input face of said integrating light pipe has a rectangular cross section and said output face of said integrating light pipe has an isosceles trapezoidal cross section.

17. The illumination device of claim 12, wherein said projection element is a combination of a condenser and objective lens.

18. The illumination device of claim 17, wherein said lens has a focal point that is offset from said output face of said integrating light pipe and said document plane in order to desensitize the image capture system to defects on said output face appearing on said document plane.

19. The illumination device of claim 12, wherein said projection element is a curved mirror.

20. The illumination device of claim 12, wherein said image sensor is a CMOS sensor.

21. The illumination device of claim 12, wherein the light has non-uniform intensity at said document plane.

22. The illumination device of claim 12, wherein a normal of said image sensor is substantially perpendicular to said document plane and a primary optical axis of the light received by said document plane is at an oblique angle relative to said document plane.

\* \* \* \* \*